US008490139B2

(12) United States Patent
Griffin et al.

(10) Patent No.: US 8,490,139 B2
(45) Date of Patent: Jul. 16, 2013

(54) METHOD AND SYSTEM FOR PUSHING CONTENT IN A BROADCAST COMMUNICATION SYSTEM

(75) Inventors: Gail V. Griffin, Santa Monica, CA (US); An T. Lam, Alhambra, CA (US); Philip F. Kuan, Torrance, CA (US); Lonnie Scott Clabaugh, San Pedro, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 208 days.

(21) Appl. No.: 12/773,782

(22) Filed: May 4, 2010

(65) Prior Publication Data

US 2011/0276997 A1 Nov. 10, 2011

(51) Int. Cl.
*H04N 7/10* (2006.01)
*H04N 5/445* (2011.01)

(52) U.S. Cl.
USPC ............ 725/56; 725/36

(58) Field of Classification Search
USPC ............ 725/56, 36
See application file for complete search history.

(56) References Cited

U.S. PATENT DOCUMENTS 8,239,893 B2 8/2012 McClanahan et al.
2003/0009763 A1 1/2003 Crinon et al.
2004/0010524 A1 1/2004 Wallace et al.
2004/0133910 A1 7/2004 Gordon et al.
2006/0092867 A1 5/2006 Muller et al.
2006/0179469 A1 8/2006 Fransman et al.
2006/0221195 A1 10/2006 Sohmers
2009/0037950 A1 2/2009 Ching et al.
2010/0037263 A1 2/2010 Riley et al.

FOREIGN PATENT DOCUMENTS

GB 2440408 1/2008
WO 03/038674 A1 5/2003
WO 2004/054147 A1 6/2004
WO 2007/052977 A1 5/2007
WO 2010/054396 A1 5/2010

OTHER PUBLICATIONS

International Search Report and Written Opinion dated Jul. 18, 2011 in International Application No. PCT/US2011/034057 filed Apr. 27, 2011 by Gail V. Griffin et al.
Final Rejection dated Jan. 3, 2013 in U.S. Appl. No. 12/773,795, filed May 4, 2010 by Gail V. Griffin et al.
Non-final Office action dated Apr. 9, 2012 in U.S. Appl. No. 12/773,795, filed May 4, 2010 by Gail V. Griffin et al.
Non-final Office action dated Apr. 17, 2013 in U.S. Appl. No. 12/773,795, filed May 4, 2010 by Gail V. Griffin et al.

*Primary Examiner* — Pankaj Kumar
*Assistant Examiner* — Franklin Andramuno

(57) ABSTRACT

A push scheduler for communicating push and carousel content and method for operating the same includes a block manager that receives content channel data from the channel listing system and forming a channel block having a channel and a time period associated therewith based on the channel data. The scheduler further includes a schedule manager that forms an assignment by assigning push and carousel content data to the channel block with a predetermined recurrence rate within the block and a material manager that controls the communication of push and carousel content based on the channel block.

28 Claims, 10 Drawing Sheets

METHOD AND SYSTEM FOR PUSHING CONTENT IN A BROADCAST COMMUNICATION SYSTEM

TECHNICAL FIELD

The present disclosure relates generally to a content communication system, and, more specifically, to a system and method for scheduling push and carousel content for distribution by the communication system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content. Interactive content is increasing in popularity.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough.

As the channels change from different levels or quality of content, such as high definition versus standard definition, the bit rates may change. Also, satellite programming provides occasional programming or channels that are not constantly broadcast. Pay-per-view content, sporting events and interactive television are examples of occasional content that is provided. Because of the constant changing of content, various channels may not be broadcast for an amount of time.

Providing customers with enhanced content may be desirable. For example, providing customers with movie trailers for a future available film through an on-demand system or a pay-per-view system may be desirable. Movie trailers may be provided as push and carousel content. Push and carousel content is content that is provided to a user device prior to a request from the user device. Push and carousel content may also include welcome videos or how-to videos for fixing or troubleshooting various consumer issues. Push and carousel content may be scheduled into channels that may be otherwise not used due to the fluctuation and content. Currently a spreadsheet is used to determine where and when to place content to be broadcasted to consumer devices. Using a spreadsheet introduces human error into the allocation system. Also, the process of manually scheduling each push and carousel content is time-consuming. Each of these elements increases the cost of the system.

In addition, movies and other content may be provided as carousel content. Carousel content is content that has a repeating schedule, interleaved with other content. Similar to push and carousel content, carousel content may also be scheduled into channels that may be otherwise not used due to the fluctuation and content. In this case, the scheduling may make more efficient use of the channel bandwidth by maximizing the number of movie titles broadcast onto the channels while still allowing the user device sufficient opportunities to record the content in a timely manner. The user device may request a particular content to be stored in memory based on the user's request. In this case, when the content is broadcast, the user device will then store the content in memory to support later viewing. The user expectation is typically that the requested content will be successfully stored into memory, with a particular success rate (for example, 95% of the time), but the user does not know the exact time the content will be stored into memory.

Once the push or carousel content is communicated to the consumer devices, it may be stored in memory for a future time until the user selects the content.

SUMMARY

The present disclosure provides a system for conveniently and accurately scheduling push and carousel content. The system allows more efficient channel usage. By having more efficient channel usage, more content may be made available to the user device, while still allowing a particular delivery rate to the user device. Queues are used to store content metadata. The content identified by the metadata on the queues is scheduled in a repeating manner.

In one aspect of the disclosure, a method for communicating push and carousel content includes receiving channel data from a channel listing system, forming a channel block having a channel and a time period associated therewith based on the channel data, selecting content for pushing or carouseling and a recurrence rate, assigning push and carousel content data to the channel block according to the recurrence rate to form an assignment, communicating push and carousel content in response to the channel block, receiving the push and carousel content at a user device and storing the push and carousel content within a storage device associated with the user device.

In another aspect of the disclosure, a push scheduler for communicating push and carousel content includes a block manager that receives content channel data from the channel listing system and forming a channel block having a channel and a time period associated therewith based on the channel data. The scheduler further includes a schedule manager that forms an assignment by assigning push and carousel content data to the channel block with a predetermined recurrence rate within the block and a material manager that controls the communication of push and carousel content based on the channel block.

In a further aspect of the disclosure, a system for communicating push and carousel content includes the push scheduler described above; a user device receiving the push and carousel content; and a storage device storing the push and carousel content associated with the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
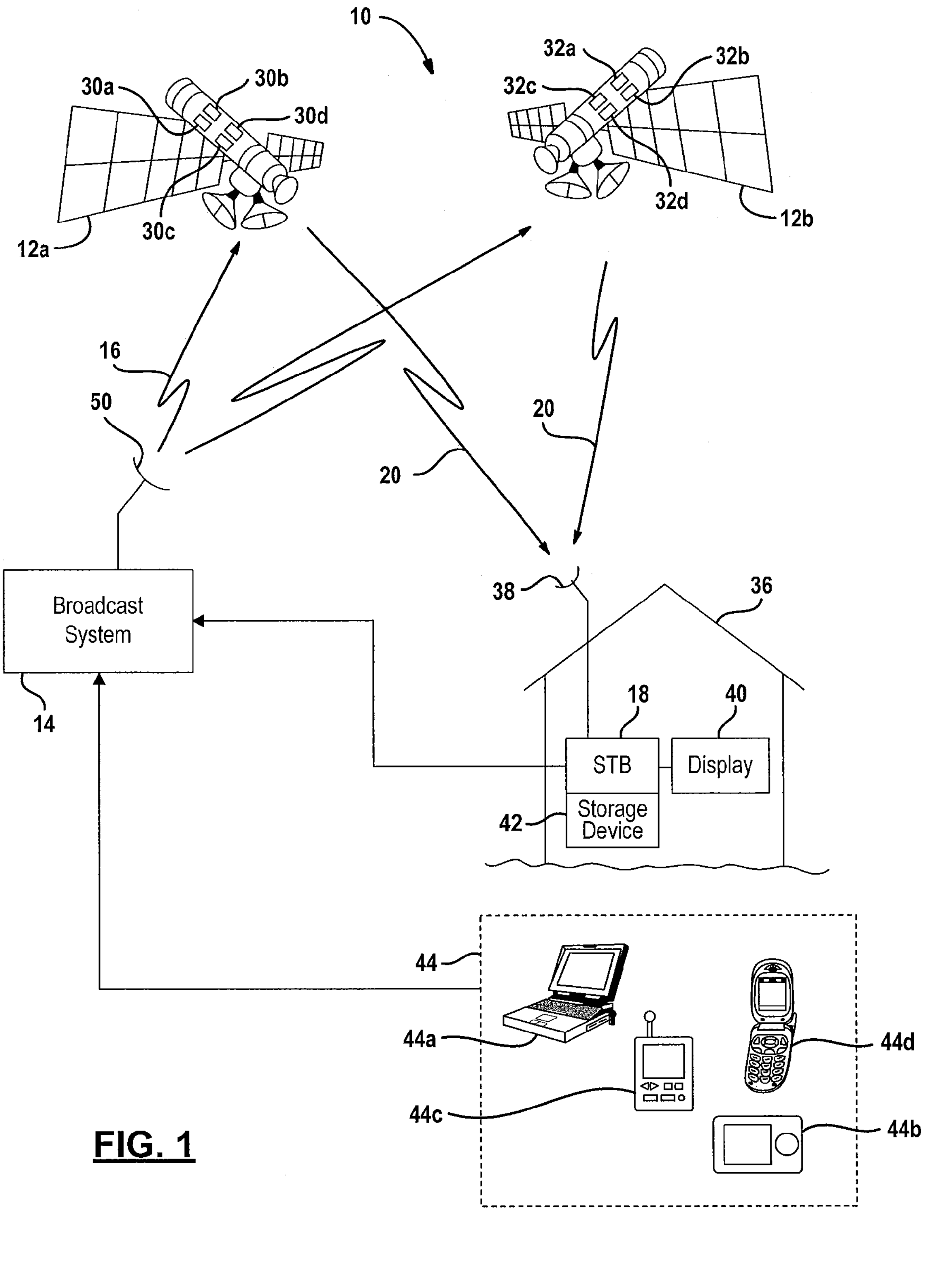
FIG. 1 is a system level view of the communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The present system is described with respect to push and carousel content. The push and carousel content may be various types of content material. Push and carousel content is sent to a user device for various reasons initiated by the broadcast system or head end so that it is available to the user device without delay. Carousel content is content that is broadcast periodically, available to be recorded, and may be requested by a user device. The push and carousel content and the carousel content may have metadata associated therewith that may also be communicated at the same time as the content.

Referring now to FIG. 1, a satellite communication system 10 is illustrated having a first satellite 12*a* and a second satellite 12*b*. The communication system 10 may be a satellite television system or data distribution system.

The system 10 may include a broadcast system 14 for generating uplink signal 16 to the satellites 12*a* and 12*b*. The signals may correspond to various channel streams or multiplex channel streams that are communicated from the satellites 12*a*, 12*b* to a fixed user device 18 through downlinks 20. Only one user device 18 is illustrated by way of example. However, a system 10 may include several user devices.

Satellite 12*a* may include a plurality of transponders of which four are illustrated as reference numerals 30*a*-30*d*. The satellite 12*b* may also include a plurality of transponders including transponders 32*a*-32*d*. The transponders 30*a*-30*d* and 32*a*-32*d* receive the uplink signals from the broadcast system 14 and direct the signal, such as television signals, through the downlinks 20 to various users. The downlink signals 20 may be Continental United States (CONUS) or may be spot beam signals. As will be further described below, various allocations of channel signals to the various transponders may be provided. Transponders 30*a*, 30*b*, 32*a* and 32*b* are uplink transponders. Transponders 30*c*, 30*d*, 32*c* and 32*d* are downlink transponders. Although only four are illustrated, several different uplink transponders and downlink transponders may be provided in each satellite.

The user device 18 may comprise a set top box (STB) disposed within a home or business 36. An antenna 38 is used to receive the downlink signals 20 and provide them to the user receiving device 18. The user receiving device 18 may be in communication with a display 40 for displaying the channel signals. The user device 18 may communicate interactive signals to the broadcast system 14 through various means include a wired or wireless network.

The set top box 18 may also have a storage device 42 associated therewith. The storage device 42 may be integrated within the set top box 18. The storage device 42 may include a digital video recorder that uses a hard disk drive for recording content that is received at the set top box 18. The storage device 42 may also be a chip or plurality of memory chips. The storage device 42 may be partitioned into a network partition and a user partition. The network partition is used for storing content that is not requested by the user of the set top box 18. Some popular content items may be stored in the network partition so that they are available for immediate use. The user partition is used to store content requested by the user.

Another type of user device may also be included in the system, a mobile receiving device 44. A plurality of mobile receiving devices is illustrated in box 44. A portable computer

44*a*, a portable media player 44*b*, a personal digital assistant 44*c* and a cellular telephone 44*d* are illustrated. Each of the devices includes an antenna that may be integrated therewith for receiving the downlink signals 20. Different types and numbers of mobile devices may also be included in the system. It should be noted that both fixed and mobile user devices may be included. Of course, either fixed or mobile alone may be used in a system. The mobile device 18 may also communicate interactive signals to the broadcast system 14 through various means include a wired or wireless network. Although not specifically illustrated, each mobile receiving device 44 may include a storage device that is used to store received video and associated audio therewith in a similar manner to that described above with respect to the storage device 42 for set top box 18.

The broadcast system 14 includes an antenna 50 for uplinking uplink signal 16 to satellites 12*a* and 12*b*. Although only one antenna 50 is illustrated for simplicity purposes, more than one antenna may be used.

Figure 2:
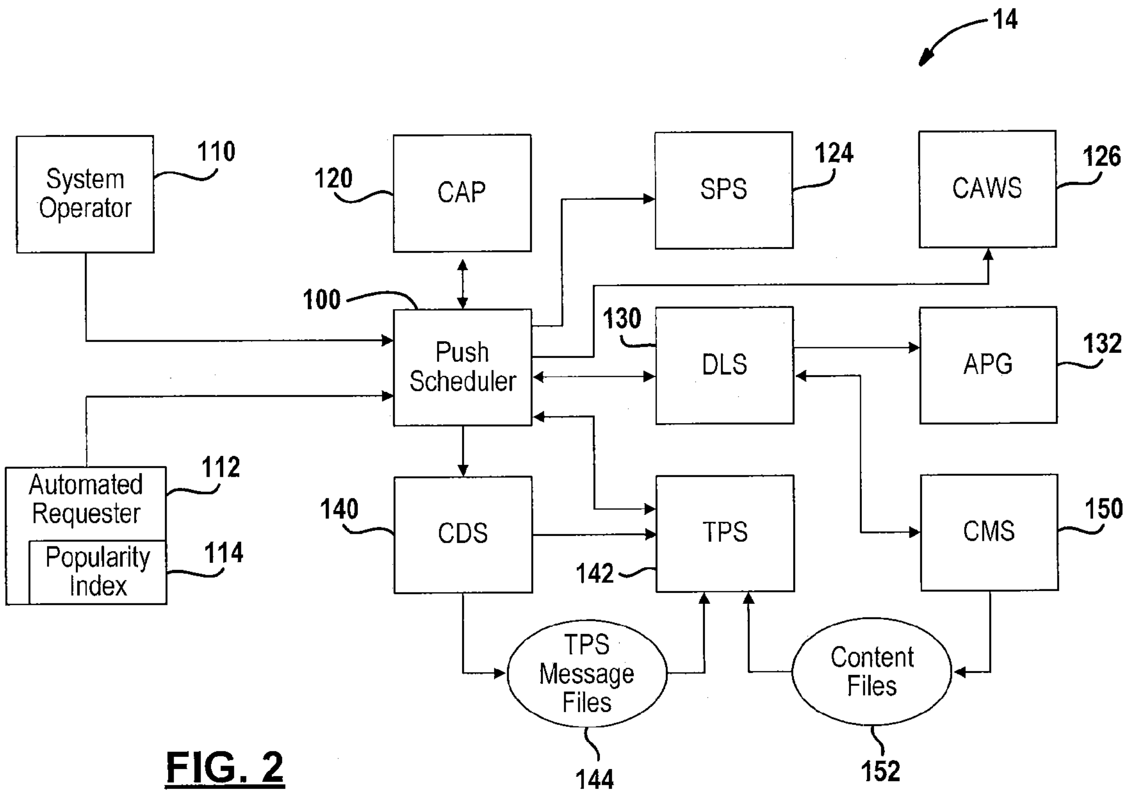
FIG. 2 is a high-level block diagrammatic view of the push scheduler in relation to other components within a broadcast system.

Referring now to FIG. 2, a block diagrammatic view of the broadcast system 14 of FIG. 1 is illustrated in further detail. The broadcast system 14 may include a push scheduler module (push scheduler) 100. The push scheduler module 100 forms an assignment of content into channel blocks in an automated manner to reduce operator and scheduling errors.

The push scheduler module 100 may receive inputs from a system operator 110 or an automated requestor 112. Both the system operator 110 and the automated requestor 112 may be a part of the push scheduler 100. A system operator 110 may manually select the content to be scheduled within a channel block. The automated requestor 112 may include a popularity score or index 114 for various content. The popularity index may be used for automatically scheduling content to be pushed by the push scheduler 100. The popularity index 114 may be generated in various manners including the user of a "What's Hot" list. Another system or the automated requestor 112 may monitor the requested push and carousel content and categorize them with a popularity index. The popularity index may be a score based upon multiple factors including how many times a piece of content is requested. The popularity index may thus pick the ten or other number most popular items and automatically schedule them to be pushed by the push scheduler 100.

The push scheduler 100 may also be in communication with a conditional access processor (CAP) 120. The CAP 120 may be used for requesting program-associated data such as future program-associated data (FPAD), current program-associated data (PAD) or ending program-associated data (XPAD). The program-associated data may be a variety of data including titles, duration, actors, directors, a short description, the studio or various other types of data or metadata. The conditional access processor 120 may provide conditional access data to the user devices (illustrated in FIG. 1) so that recording of push and carousel content may be achieved.

A schedule pad server (SPS) 124 may receive the program-associated data and deliver the program-associated data to various devices. The schedule pad server 124 may update a schedule manager with results of processing program-associated data.

A conditional access web service (CAWS) 126 may also be in communication with the push scheduler 100. The conditional access web service may provide a web service for processing conditional access data. A schedule manager may send a content reference identifier (CRID) update to the conditional access web service 126. The CAWS system 126 may process requests from the push scheduler 100 to remove content that has previously been pushed to a user device.

A DIRECTV® listing service (DLS) 130 may also be in communication with a push scheduler 100. The listing service may supply content material data such as metadata to the push scheduler 100. Also, the DLS 130 may also provide channel data to the push scheduler 100. The channel data may include but is not limited to channel start time, a channel stop time, a content channel bit rate, a transponder identifier, and a service channel identifier. CRID and scheduling data may be requested by the DLS 130 from the push scheduler 100.

The listing service 130 may also be in communication with an advanced program guide (APG) module 132. The advanced program guide module 132 is used for communicating the data for listings in a grid-guide format to the user devices based upon the listings in the listing service 130.

The push scheduler 100 may also be in communication with a content distribution system (CDS) 140. The content distribution system 140 may be used together with the transport processing system (TPS) 142 for broadcasting the content over the satellite or other network. The CDS 140 may receive updated scheduled events from the push scheduler 100. Each stream associated with satellite or other network in the CDS 140 may be updated. Updates and schedules may be provided to the TPS 142 through TPS message files 144. The transport processing system 142 may be used to transport both the conditional access information described above as well as the content from the content management system 150. Content files 152 may be provided to the transport processing system 142 at appropriate times for communication through the satellite or other network. The content management system 150 may be used to store the content until the appropriate broadcast time.

Figure 3:
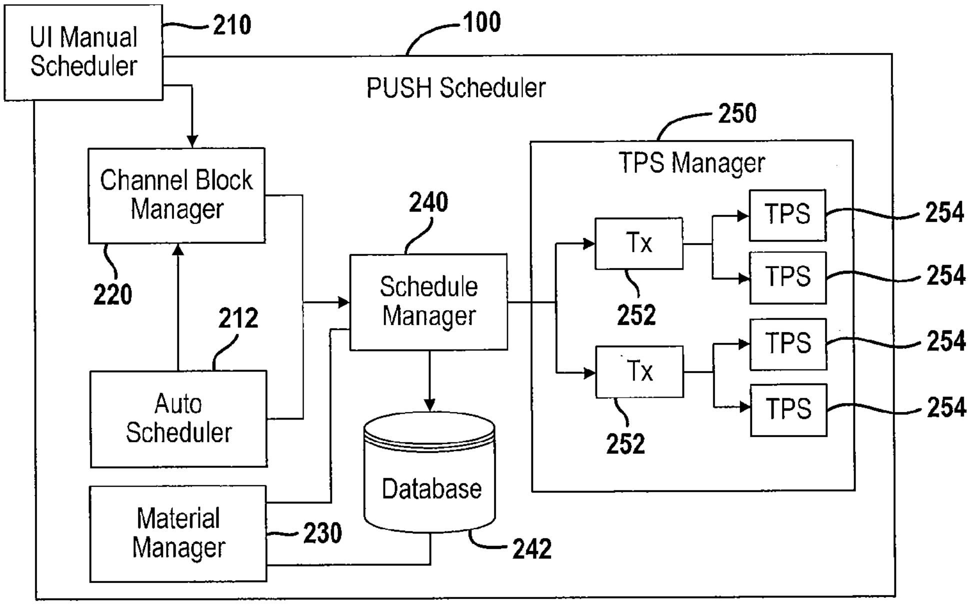
FIG. 3 is a block diagrammatic view of a push scheduler architecture for the push scheduling system illustrated in FIG. 2.

Referring now to FIG. 3, the push scheduler 100 is illustrated in further detail. The push scheduler 100 may include a user interface for a manual scheduler 210 that provides an interface to the system operator 110 for manually scheduling content material by forming an assignment within a channel block.

An auto scheduler 212 may also be included within the push scheduler 100. The auto scheduler 212 may automatically schedule content based on score. The auto scheduler 212 may also receive content scores from an external system based upon requested downloads. The auto scheduler may also schedule content material based upon queues. That is, various queues may be assigned with different priority levels. Content material may be added to the queues. Content material is then scheduled from the queues into channel blocks automatically, simplifying the scheduling task. The queues are cyclical and content material in the queues is repeated while the content material has not expired. The order of the scheduling of content material from the queues may be FIFO (First In First Out) or another suitable algorithm. The assignment of content to queues will be further described below in FIGS. 14 and 15.

The push scheduler 100 may also include a channel block manager 220. The channel block manager 220 may be used to determine the channel blocks based upon the channel data and schedules received from the listing service. The channel blocks may include time slots. The channel block may extend over various time periods including more than one day. The channel block manager 220 may define the channel blocks and update channel blocks based upon changes from the listing service.

The push scheduler 100 may also include a material manager 230. The material manager 230 may control various user interface sessions based upon various material schedule timelines. The material manager 230 may be used to control the importation of various content as well as generating CRID. The material manager 230 may communicate CRIDs to the listing service schedule. The material manager 230 may also be used to control the program-associated data and the requesting of program-associated data. The material manager 230 may provide timing for providing various material data as well as material timing. This will be described further below.

The push scheduler 100 may also include a schedule manager 240 that assigns the material to be broadcast within the channel blocks. The schedule manager 240 generates an assignment of the push and carousel content material 230 to the channel blocks from the channel block manager 220 to form an assignment. The schedule manager 240 may retrieve various data from a database 242. The material manager 230 may also store and retrieve data from the database 242.

The schedule manager may include an event scheduler 240 that communicates with a CDS 140 in FIG. 2. The schedule manager may also include an event scheduler that communicates with a TPS manager 250. The TPS manager 250 may include transmission processors 252 that communicate various material to the transport processing systems 254 according to the assignments. Various channels may be present on various transport processing systems 254. The channels described herein may be broadcast-type channels but may not correspond to network-type channels. The channels described herein may be channels within the transport processing system 254 that are used for data and are assigned based on various times and the like. The channels may be referred to as service channels. Broadcasting channels may be assigned to different TPS channels at various times of the day or week.

The transmission blocks 252 may include a multiplexer for joining various channels together as well as a modulator. Other components may also be included in the transmitters 252 depending on the type of network through which the push material is communicated.

Figure 4:
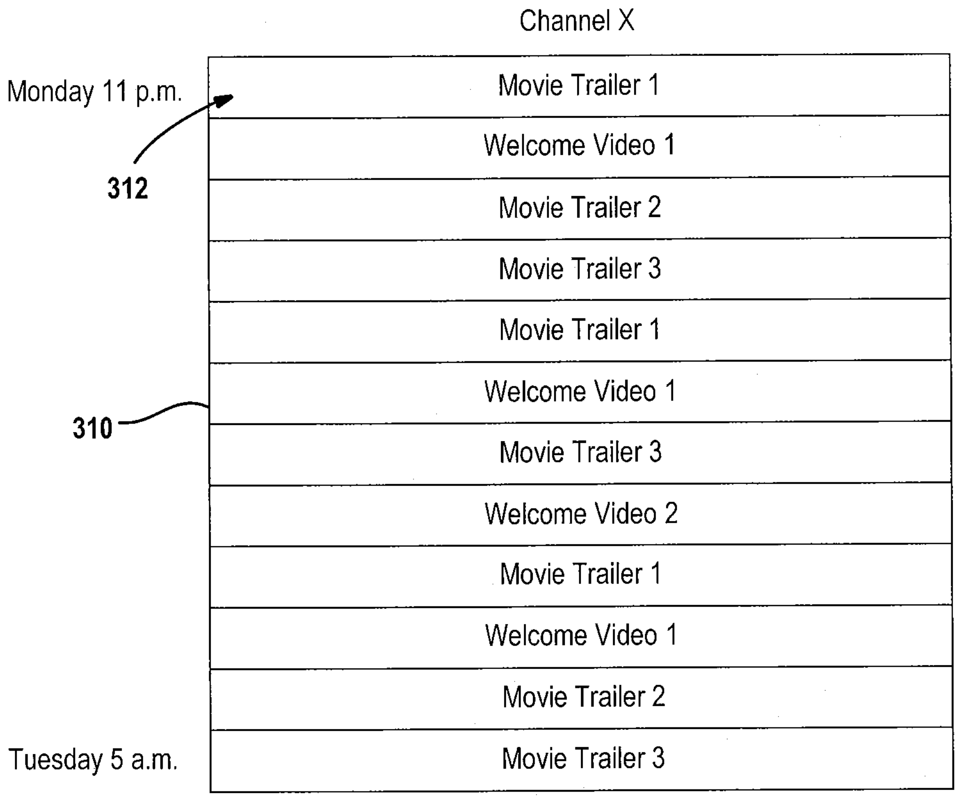
FIG. 4 is a schematic representation of a channel block according to the present disclosure.

Referring now to FIG. 4, an example of a channel block 310 is illustrated for broadcast Channel X. As mentioned above, the channel block 310 may provide various types of content. In this example, movie trailer 1, movie trailer 2 and movie trailer 3 are all provided within various time blocks 312 of the channel block 310. The push scheduling system may automatically provide repeated occurrences of various types of push and carousel content. For example, movie trailer 1 is repeated within the channel block three times. The recurrence rate is the rate at which the content is repeated. The welcome video 1 is repeated twice, movie trailer 2 is repeated twice and movie trailer 3 is repeated 3 times. The operator of the push scheduling system may merely place the number of iterations for broadcasting various push and carousel content. The push scheduling system may thus automatically configure the channel blocks. By providing repeated times, it is likely that a tuner within a set top box or other user device will be available for receiving the push and carousel content. The push scheduler may determine a recurrence rate for the push schedule so that the content is likely to be received and stored within the user device.

Figure 5:
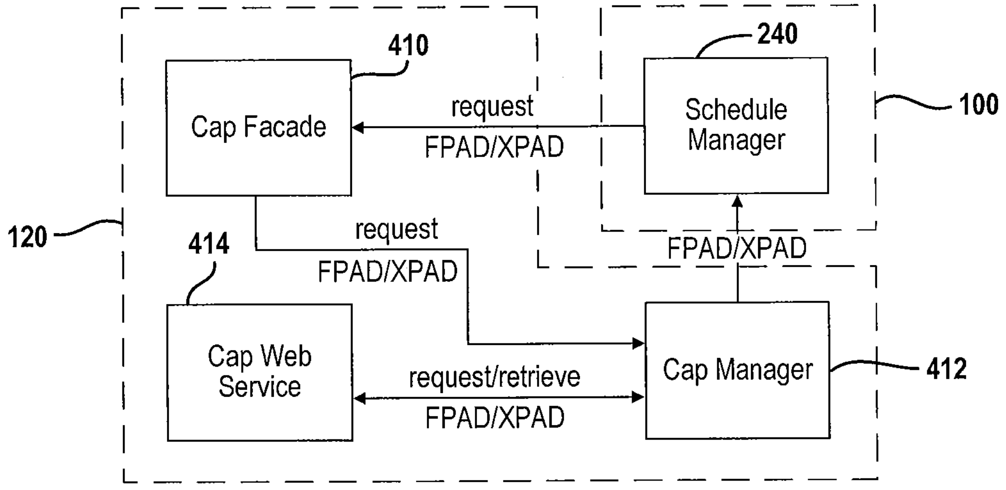
FIG. 5 is a block diagrammatic view of the push scheduler in communication with a CAP system.

Referring now to FIG. 5, an interface between the push scheduler 100 and the conditional access processor (CAP) 120 is set forth. In short, the conditional access processor system 120 may provide program-associated data to the push scheduler 100. In this example, only the schedule manager 240 of the push scheduler is illustrated for simplicity. The schedule manager 240 may request future program-associated data (FPAD) and terminating program-associated data (XPAD) from a conditional access processor façade 410. The conditional access processor façade 410 may communicate the request to a conditional access processor manager 412. The conditional access processor manager 412 may request and retrieve the program-associated data from a conditional access web service 414. The program-associated data such as the future program-associated data, current program-associated data and the terminating program-associated data may be provided to the schedule manager 240 from the CAP manager 412. Of course, functionally the conditional access processor façade 410 and the CAP manager 412 may be incorporated into a single unit. The schedule manager 240 is thus updated with the program-associated data which may be used for scheduling push and carousel content by the push scheduler 100.

Figure 6:
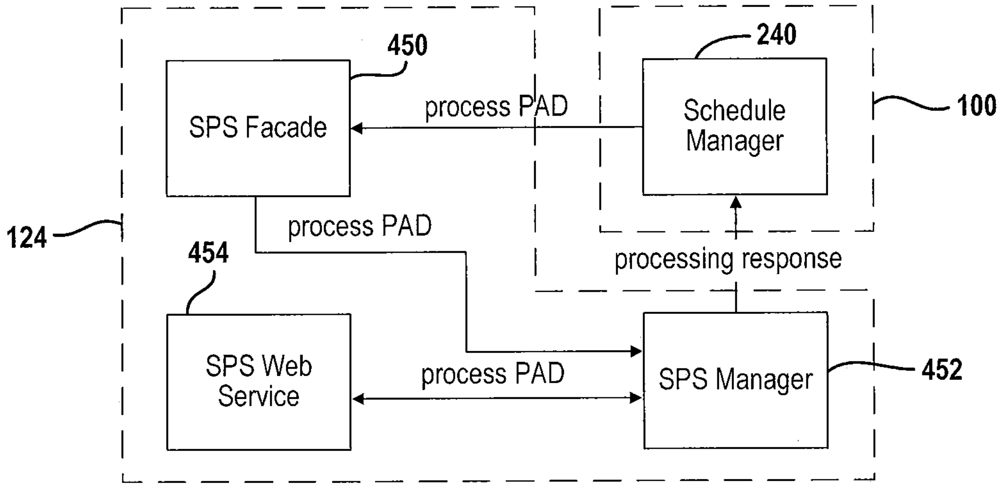
FIG. 6 is a block diagrammatic view of the push scheduler in communication with an SPS system.

Referring now to FIG. 6, the schedule PAD server 124 is illustrated in further detail. The schedule pad server 124 is shown connected to the schedule manager 240 of the push scheduler 100. The schedule manager 240 may provide the parameters for processing program-associated data that includes the needed parameters. The SPS façade may call the method in an SPS manager 452 to process the program-associated data. An SPS web service 454 may be used to process the program and associated data and update the schedule manager with the result. The SPS manager 452 may provide the processed program-associated data to the schedule manager 240. The process schedule pad data may include the schedule type, the schedule start time, the schedule end time, and the generation time. A description, broadcast operation channel and channel may also be provided. The processed program-associated data may ultimately be communicated to the conditional access system so that a conditional access packet may be generated therefrom.

Figure 7:
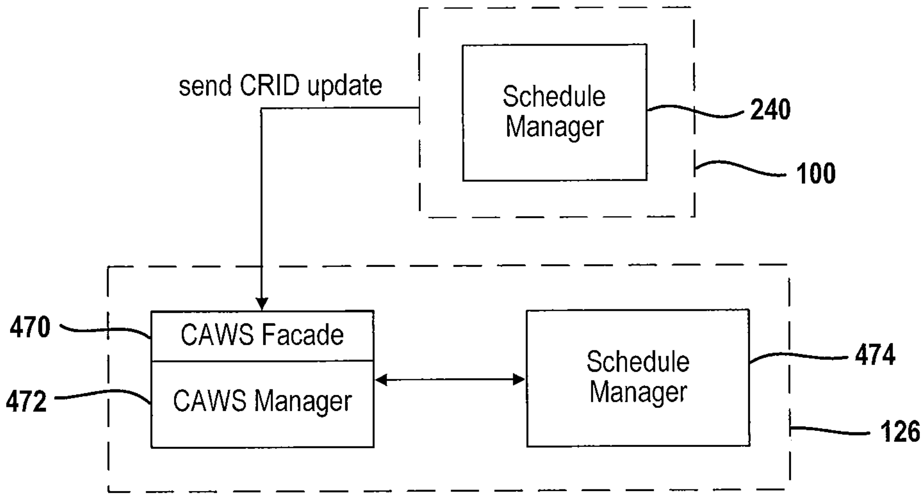
FIG. 7 is a block diagrammatic view of a push scheduler in communication with a CAWS system.

Referring now to FIG. 7, the interface between the schedule manager 240 and the conditional access web service 126 is illustrated. The conditional access web service (CAWS) 126 may include a conditional access web service façade 470 and a conditional access web service manager 472. These modules may be physically together or may be separated. The schedule manager 240 may send a content reference identifier (CRID) to the CAWS façade and CAWS manager 272. A killer conditional access packet may be generated from the conditional access web service 126 using the CAP web service 474. The CAP provided from the conditional access web service will delete the content stored within a user device. The CAP may be generated based upon the CRID.

Figure 8:
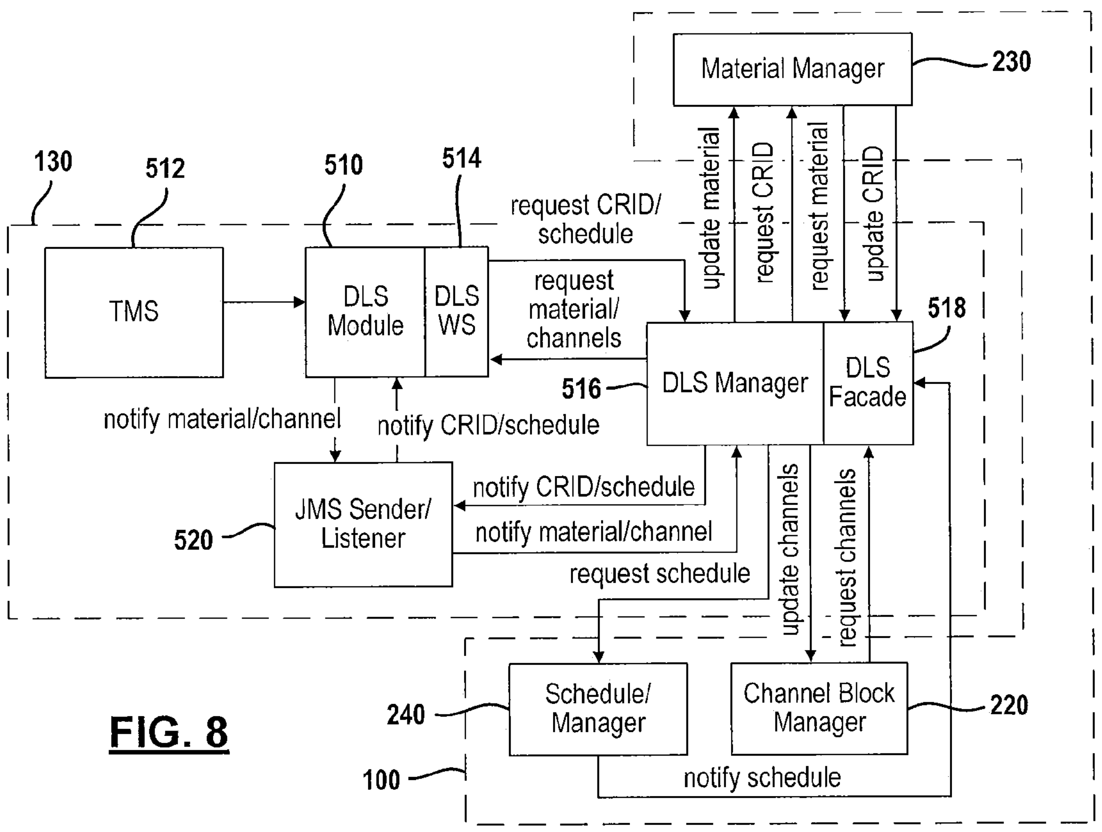
FIG. 8 is a block diagrammatic view of a push scheduler in communication with a listing system.

Referring now to FIG. 8, a simplified block diagrammatic view illustrating the communication between the listing service (DLS) 130 of the push scheduler 100 is illustrated. The DLS 130 may include a DLS module 510. The DLS module 510 may receive external data from the external data input 512. The external data input may be used for receiving various data regarding programming. The external data input is illustrated as a Times Media Service® (TMS) input. TMS is just one example of an external data service. The external data may provide channels, programs, schedules as an input to the listing system 130. The various types and formats of the data may also be provided. Various types of data may also be provided that correspond to the programming.

The DLS module 510 may be formed together with a DLS web service module 514. The DLS web service module 514 may provide an interface to a DLS manager 516 and a DLS façade 518. The DLS module 510 may also be in communication with a JAVA message service (JMS) sender/listener 520. The JMS sender/listener 520 may be in communication with the DLS manager 516. The DLS module 510 specifies content channels that need to be updated or deleted. The channel block manager 220 may request the initial list of channels and process updates to the DLS channel definitions. The material manager 230 may provide a notification that material has changed and provides material details upon request. The DLS façade 518 provides an interface for the DLS and channel block manager to retrieve data. The DLS web service 514 provides an interface for the DLS manager to request channels. The DLS manager processes requests for material, schedules and channels. The DLS web service 514 may request CRID and schedule changes from the DLS manager 516. In general, the push scheduler 100 notifies the DLS 130 whenever a schedule has been updated. The push scheduler 100 allows the DLS to extract the schedule, given a content channel ID, start time and end time. A content channel identifier may be used by the push scheduler to extract channel data from the list in service. The DLS 130 communicates with the push scheduler 100 whenever channel details have been added, updated or deleted. The push scheduler may also notify the DLS 510 when the CRID of material content has been updated. A material identifier may be used by the DLS to extract the CRID of the material. A JMS interface 520 is the interface between the push scheduler and the DLS 130. The push scheduler is notified by the DLS 510 with an update command whenever material has been updated. The DLS 510 notifies the push scheduler 100 with a delete command whenever a materials state progresses from completed to cancelled. In short, the DLS 130 manages the content and metadata associated with push and carousel content.

Figure 9:
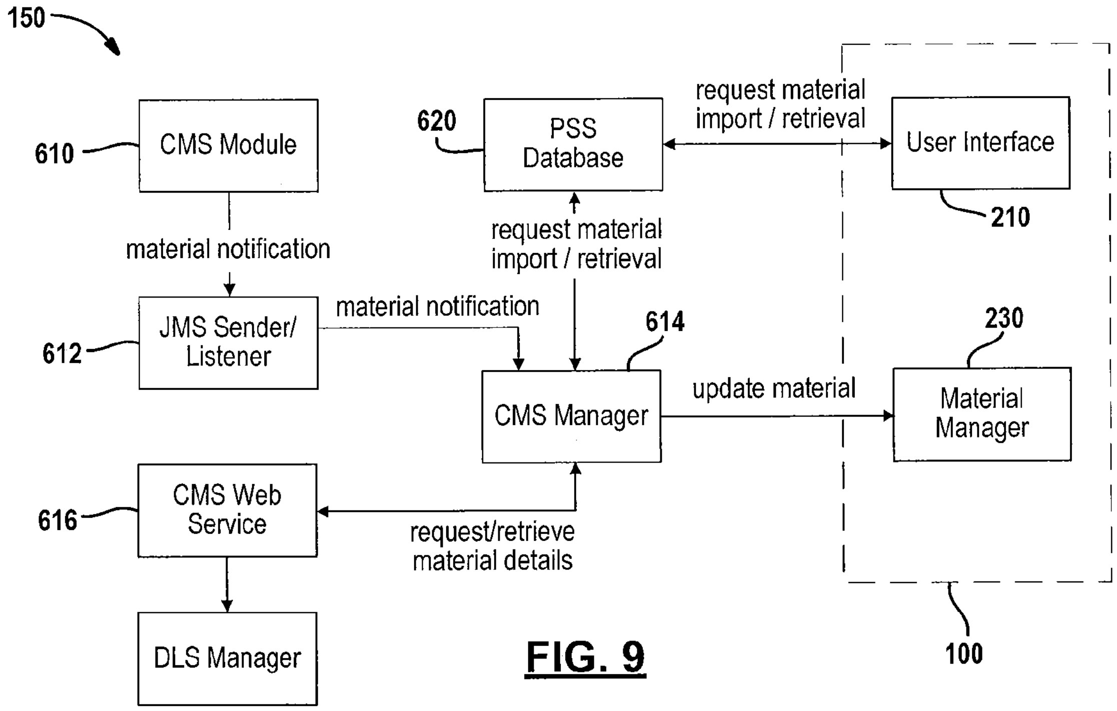
FIG. 9 is a block diagrammatic view of the push scheduler in communication with a CMS system.

Referring now to FIG. 9, the CMS 150 includes a CMS module 610 that provides a material notification to a JMS sender listener module 612. A material notification may be provided to a CMS manager 614. The CMS manager 516 may also be in communication with a CMS web service 616 that may request and retrieve material details. The CMS web service 616 may request or retrieve material details from the DLS manager 614 and vice versa. CMS manager 516 may be in communication with the PSS database 620. By providing the Push Scheduling System (PSS) with its own database, the operational dependencies of the system are reduced. This may allow one system to be maintained while the other remains operational. The PSS database 620 stores material metadata. The push scheduler 100 may include the push user interface 210 and the material manager 230. The material manager 230 processes requests for materials by the material manager 230. The material manager 230 processes requests to material updates into the database tables within the push scheduler illustrated in FIG. 3. The push scheduler user interface 210 provides requests for material imports and retrievals.

Figure 10:
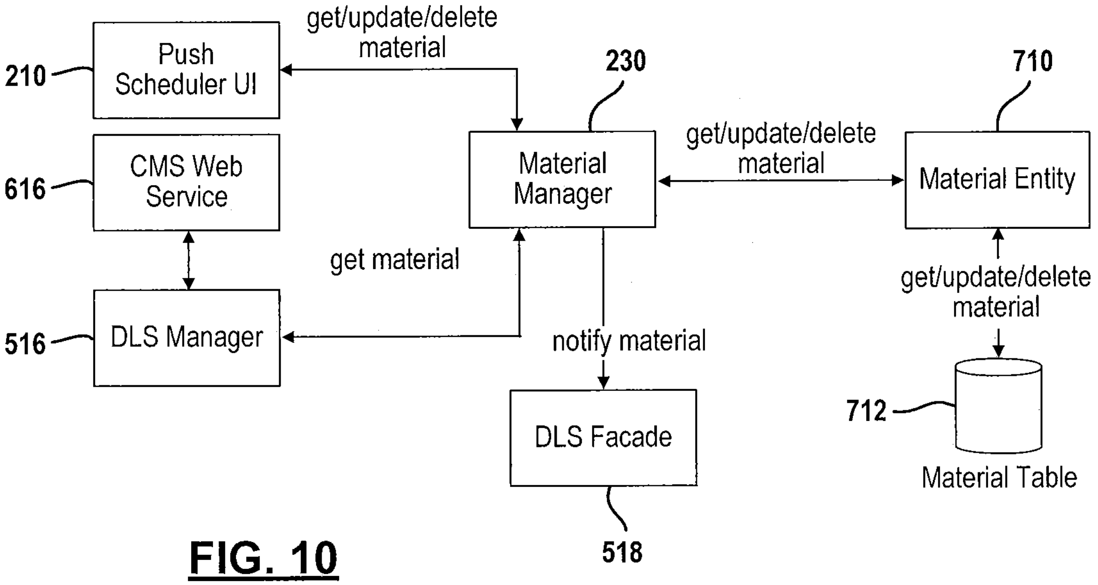
FIG. 10 is a block diagrammatic view of the material handler in communication with the material entity and other components of the broadcast system.

Referring now to FIG. 10, the material manager 230 and a material entity 710 are illustrated together with interfaces to other components previously described. The material entity 710 may communicate with a material table 712. Communications between the material entity 710 and the material table 712 may include getting, updating and deleting material. The push scheduler user interface (UI) 210 details the materials that need to be retrieved, updated or deleted. The DLS manager 516 may also specify material details that need to be updated or deleted. The DLS façade 518 may be notified whenever a material is updated or deleted. The material manager 230 performs get, update or deletion by calling the material entity 710. The material entity 710 ultimately performs the appropriate action on the material tables 712.

Figure 11:
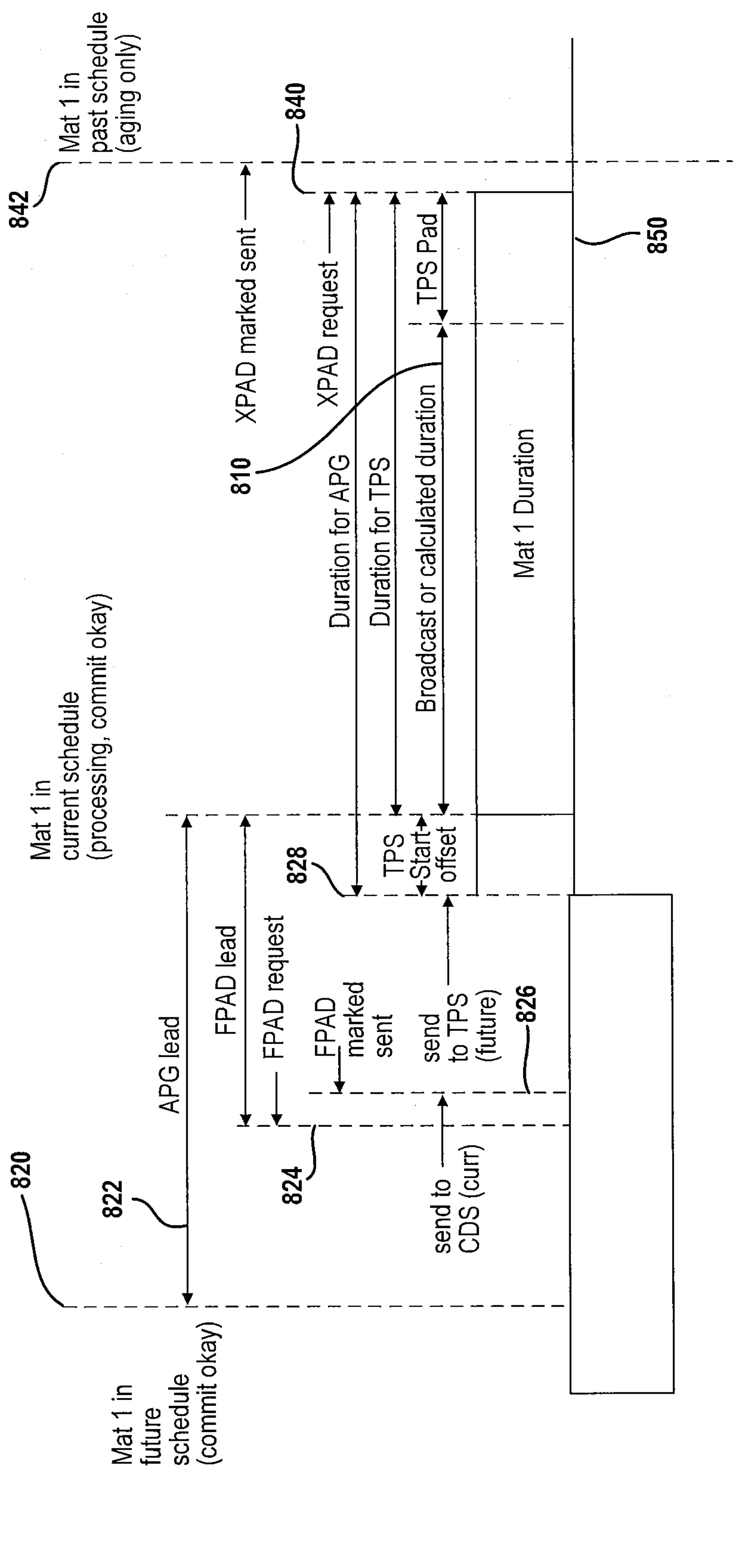
FIG. 11 is a timing chart of a material duration and timing of program-associated data.

Referring now to FIG. 11, the relative timing for a content material (mat 1) is set forth. Prior to the material duration 810 which corresponds to the time the material is being broadcasted, the material is committed to a future schedule at time 820. The time 820 may provide a lead time 822 for program guide material to be provided. Because the commitment to the material to a future schedule is provided, the lead time before the material duration may be established. This may be a fixed amount of time or vary depending on different factors including but not limited to the type of material.

At time 824 the duration before the material time corresponding to the future program-associated data and program-associated data (FPAD) request may be established. The program-associated data may then be provided to user devices. At time 826 the material schedule may be communicated to the content delivery service. At time 828 a TPS offset may be established before the start of the material at time before the material duration 810. The time 828 may allow the transport processing system to become ready to broadcast the material. The duration for the program guide entry corresponding to the material typically includes the TPS start offset, material duration, and TPS PAD time. The actual use of the transport processing system may start at the beginning of the mat 1 duration or broadcast duration and extend to just after the material broadcast duration. The termination program-associated (XPAD) data may be requested at time 840 and be sent at time 842. A buffer time of TPS PAD 850 may be provided between the end of the material duration 810 and the request for XPAD.

Figure 12:
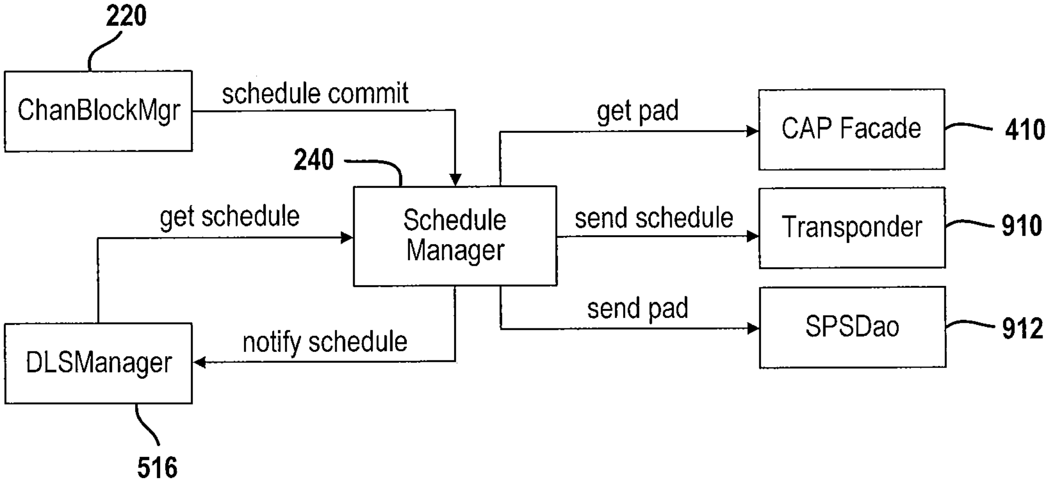
FIG. 12 is a high-level overview of the scheduler manager according to the present disclosure.

Referring now to FIG. 12, the schedule manager 240 is illustrated in detail with connections to the channel block manager 220, the DLS manager 516, the CAP façade 410, a transponder 910 and an SPS data access object (DAO) 912. The schedule manager 240 maintains the active schedule. Changes to the schedule may be made in the channel block manager 220 and be committed to the schedule manager 240. Components registered to listen to the schedule change, such as the DLS Manager 516, may be notified of scheduled changes. The register components may have to retrieve the updated schedules from the schedule manager 240. The schedule manager 240 may communicate asynchronously with the CAP façade 410 to create future PADs and delete PADs. The schedule manager 240 may also communicate asynchronously with the SPS DAO 912 to send out program-associated data. The schedule manager 240 may also communicate asynchronously with a transponder or with the CDS to issue a send command to broadcast material.

Figure 13:
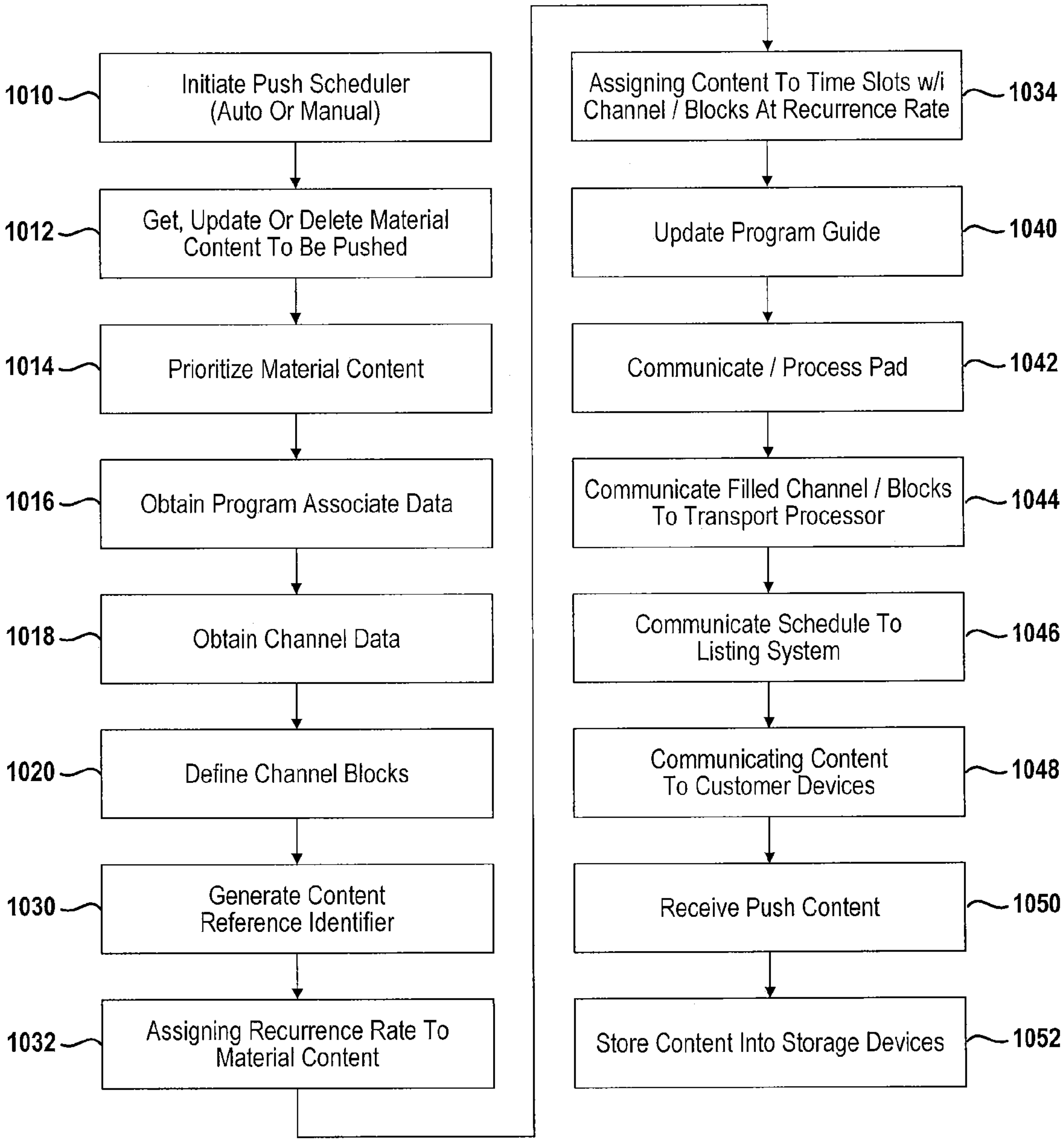
FIG. 13 is a flowchart of a method for operating the push scheduler system according to the present disclosure.

Referring now to FIG. 13, a method for operating the push scheduler system is set forth. It should be noted that this is only one method for operating the push scheduler as other variations are described above.

In step 1010, the push scheduler is initiated. The push scheduler, as mentioned above, may be automatically initiated or manually initiated. That is, content in a specific list, such as a top 10 list or "What's Hot" list, may initiate the scheduler to send various material content. The system may also be initiated manually by a user.

In step 1012, material content to be pushed or carouseled is obtained or identified by the push scheduler. The material may be received or stored in a content management system and provided only when it is desired to broadcast the content. The system may also be updated as to changes in the material that are available. Changes may include deletions of material. In step 1014, the material content may be prioritized. Content may be prioritized by a score. The score may be developed based upon the number of downloads requested for a particular content or other criteria.

In step 1016, the program-associated data (FPAD) corresponding to the content may be obtained by the push scheduling system. The program-associated data may be received from the CAP system as described above.

In step 1018, channel data may be obtained from a listing service. The listing service may obtain the channel data from a data service. The channel data may include the schedule times of broadcast as well as the associated broadcast channel and other identifiers.

In step 1020, the push scheduling system forms channel blocks from the channel data. The channel blocks correspond to a time period on a particular channel that is available for broadcasting push and carousel content. Channel blocks may be defined for different types of materials. A channel block may, for example, be set-up to communicate different types of content such as high definition content, standard definition content, or specific types of content such as a movie trailer channel block, a welcome video channel block, a movie channel block, advertising channel block or the like.

In step 1030, if content is provided that does not yet have a content reference identifier (CRID), and a CRID is needed, a content reference identifier will be generated.

In step 1032, a recurrence rate of the material content may be assigned. The recurrence rate may be automatically assigned based upon the type of content or may be manually assigned by a system operator. In step 1034, content is assigned to time slots within the channel blocks. This is performed by the schedule manager 240 as described above. The assignment of content to the time slots may be based upon the recurrence rate so that the number of recurrences within the time block meets the specified recurrence rate from step 1032. When the assignment is performed a push schedule is generated for the channel block.

In step 1040, the program guide is updated with the scheduled data. In step 1042, program-associated data (FPAD) may be processed by the schedule pad server and communicated to the user devices. In step 1044, the filled channel block schedule is communicated to a transport processor or CDS. In step 1046, the schedule is also communicated to a listing system. In step 1048, the content is communicated to customer devices. In step 1050, the push and carousel content is received by the user device. In step 1052, the content is stored into the storage devices. The content may be stored in a pushed content area (network) for material that is pushed, or a user area if the content was carouseled, and the user device requested the recording of the material.

Figure 14:
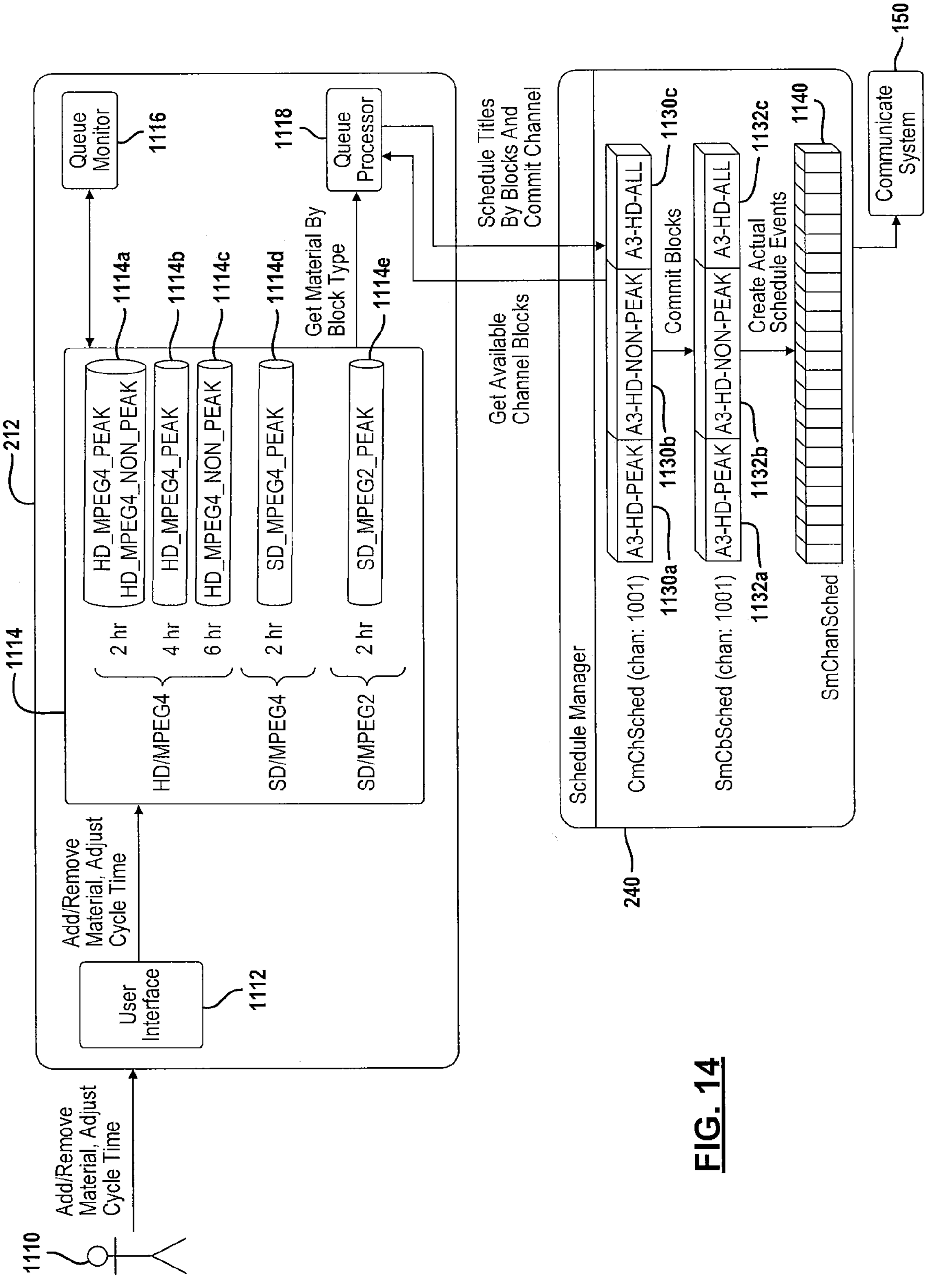
FIG. 14 is a block diagrammatic view of the auto scheduler 212.

Referring now to FIG. 14, the auto scheduler 212 is illustrated in further detail. The auto scheduler 212 may be used to automate the schedule of material on channel blocks as frequently as desired to increase the likelihood of material reaching the customer's set to box or user device. The material scheduling from the queue to the channel blocks may take into consideration the start and stop queuing times of the material, the linear time, the queue priority level, and the schedule in advance value associated with the queue's block type. Content material may be broadcasted with CRID values that may include an actual CRID value or a null CRID value. In this example, the block types are not associated with a particular system type and the definition type so the user may be responsible for assigning a block type mapped to channels with compatible system types and definition types. An example of a system type is A3, legacy and the like. A definition type may be standard definition or high definition. A system operator 1110 may add or remove content material and adjust cycle times of the content using a user interface 1112. The user interface may display a queue's content and metadata. The user interface 1112 may allow the user to select titles and add it to a compatible queue. A graphical user interface displayed on a display associated with the auto scheduler may be displayed to facilitate the user in the selection process. Items may be added or removed from queue based upon a particular user. Items may be removed from the queue based upon an expiration time and/or date. A cycle time of the queue may also be specified by the system operator 1110. The cycle time of the queue is when the queue restarts the sequence of broadcasting, typically from the beginning. The broadcast start and end time of a title may be input by the operator 1110 at the user interface 1112. When a specific broadcast start time and end time are not input, the broadcast dates may default to the particular content materials rights start and end dates. A pay-per-view identifier may also be associated and broadcast with the particular material.

The user interface 1112 is in communication with a queue 1114. The queue 1114 comprises a plurality of queues that may be defined by transport type and a definition type. For example, a plurality of queues 1114*a*-1114*e* is illustrated in this example. Queue 1114*a* corresponds to a high-definition MPEG4 peak and non-peak type, queue 1114*b* corresponds to a high-definition MPEG4 peak type, and queue 1114*c* corresponds to a high-definition MPEG4 non-peak type. Each of the queues 1114*a-c* corresponds to high-definition and MPEG4. The queues may also have cycle times such as two-hour, four-hour and six-hour cycles, respectively.

Another queue 1114*d* corresponds to a standard definition MPEG4 peak while the standard definition MPEG2 peak queue is 1114*e*.

A queue monitor 1116 may track the actual cycle times and provide a queue progress summary through the user interface 1112 to the system operator 1110.

A queue processor 1118 may be used to ultimately assign the queue contents to channel blocks. The queue processor 1118 may get the queue blocks and compile a list of titles for the blocks using the queues. The queue processor 1118 may be in communication with the schedule manager 240 that schedules the various channels. As is illustrated in FIG. 14, the schedule manager may have various channel blocks associated therewith. The channel blocks are provided to the queue processor 1118 from the schedule manager 240 and the titles are scheduled onto blocks. As illustrated, various channel blocks 1130*a*, 1130*b*, 1130*c* include an A3HD peak block 1130*a*, an A3HD non-peak block 1130*b*, and an A3HD peak and non-peak block 1130*c*. Blocks 1132*a*, 1132*b* and 1132*c* illustrate committed blocks for channels. Blocks 1140 illustrate the committed channel schedule with the various blocks inserted therein. Each of the individual scheduled items in 1140 corresponds to a particular content title to be communicated to the user device. A communication system 1150 communicates the content in the channel blocks to the user device.

Figure 15:
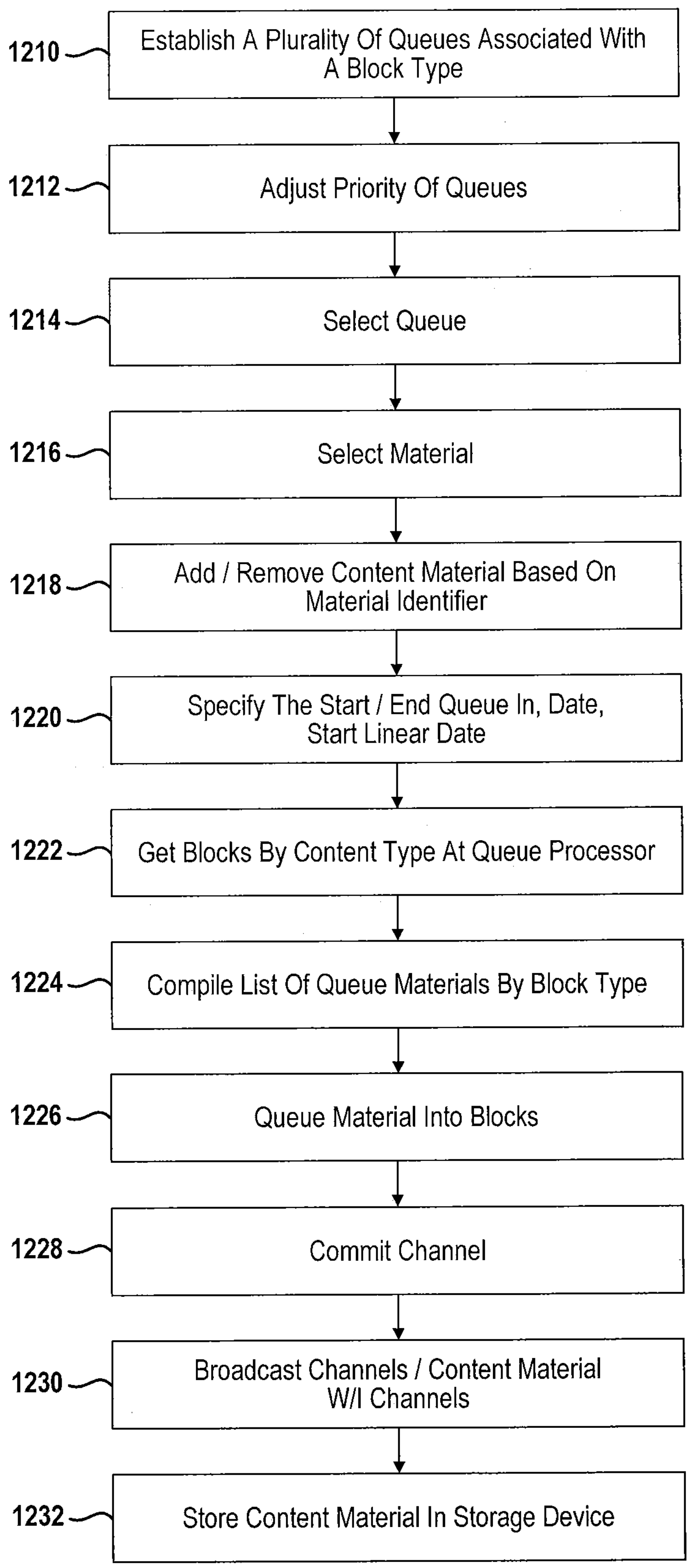
FIG. 15 is a flowchart of a method for operating the auto scheduler.

Referring now to FIG. 15, a method for scheduling content titles within a channel block is set forth. In step 1210, a plurality of queues with associated block types is provided. As mentioned above, different high-definition and standard-definition blocks may be provided. Peak and non-peak, as well as different MPEG formats, may also be associated with a queue. The queues may also be associated with a predetermined content type. For example, trailers may have a different content type than movies and welcome videos. Different group types may be scheduled into different types of channel blocks. The user interface associated with the device may allow the system operator to specify the queue based merely upon the type of material to be scheduled. As an example, trailers may have a certain type of priority. As is described herein, the prioritization may have to do with the frequency or size of the block. Higher priority channel blocks may have more space available. Blocks may be setup for prime time or peak periods and off prime or non-peak periods. Non-peak periods for broadcasting may correspond to a higher chance of successful delivery to the user device since tuner conflicts at the specific set top boxes are less likely during such times. Content may be assigned to non-assigned blocks.

In step 1212, the priority of the queues may be adjusted by the operator through the user interface. In step 1214, a queue is selected by the operator. In step 1216 a material is selected for the queue. In step 1218, the content may be stored within the queue. The content may be merely stored by providing a material identifier to the queue. In step 1220, a start time, queuing date, linear start date and the like may also be assigned to the material within the queue. In step 1222, blocks may be obtained by the queue processor based upon the content type. In step 1224, a list of the queue materials may be provided by block type. In step 1226, the materials may be scheduled into blocks. The blocks used may be uncommitted or unassigned blocks. A schedule is committed to the channel in step 1228. In step 1230, the channels are broadcasted with the various material, corresponding to the schedule created from material in the queues. The schedule manager may repeatedly broadcast the content in a carousel-like fashion to the user devices based on a cycle time for the content and content queue. In step 1232, the content material broadcasted through the channels of the communication system is stored after being received by the user device. The content material may be stored in different ways depending how the block is provided. For example, the content material may be stored within a network partition if it was not requested specifically by a user, for push content. The content may be stored in a user partition if it was requested by a use, for carousel content.

Material may be classified as being delivered with VOD (non-linear) or PPV (linear) splits, for studio payments. The start linear date described in 1220 defines the point in time where material is classified as linear, for the linear split. Before that time, the material is classified as having the non-linear, for the non-linear split.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method for communicating push and carousel content comprising:

receiving channel data from a channel listing system;

forming a channel block having a channel and a time period associated therewith based on the channel data;

selecting content for pushing and carouseling and a recurrence rate;

assigning push and carousel content data to the channel block according to the recurrence rate to form an assignment;

communicating push and carousel content in response to the channel block;

receiving the push and carousel content at a user device; and storing the push and carousel content within a storage device associated with the user device.

2. A method as recited in claim 1 wherein assigning push and carousel content comprises automatically assigning scheduling content the based on a popularity score.

3. A method as recited in claim 1 further comprising after assigning push and carousel content, updating the channel listing system with the assignment.

4. A method as recited in claim 1 further comprising communicating a notification of the assignment to a storage device.

5. A method as recited in claim 1 wherein communicating push and carousel content comprises retrieving push and carousel content from a content management system based on the assignment.

6. A method as recited in claim 1 further comprising, based on the assignment, scheduling transmission of program associated data.

7. A method as recited in claim 6 wherein scheduling program associated data comprises scheduling future program associated data, current program associated data and termination program associated data.

8. A method as recited in claim 1 wherein the blocks extend over multiple days.

9. A method as recited in claim 1 wherein receiving channel data comprises receiving a content channel start time, a channel stop time and content channel bit rate.

10. A method as recited in claim 1 wherein receiving channel data comprises receiving a channel start time, a channel stop time, a channel bit rate, a transponder identifier, and a service channel identifier.

11. A method as recited in claim 1 wherein receiving the channel data comprises receiving the channel data when a channel change occurs at the listing system.

12. A method as recited in claim 1 wherein assigning push and carousel content comprises assigning push and carousel content to a user interface generated request.

13. A method as recited in claim 1 wherein communicating content comprises communicating push and carousel content through a satellite and wherein storing the push and carousel content on a storage device associated with the user device comprises storing the push and carousel content within a set top box.

14. A method as recited in claim 1 wherein communicating content comprises communicating push and carousel content through a broadband system.

15. A push scheduler module for communicating push and carousel content comprising:

a block manager module that electronically receives content channel data from a channel listing system and forming a channel block having a channel and a time period associated therewith based on the channel data;

a schedule manager module that electronically forms an assignment by assigning push and carousel content data to the channel block with a predetermined recurrence rate within the channel block; and a material manager module that controls the electronic communication of push and carousel content based on the channel block.

16. A system comprising:

a push scheduler module as recited in claim 15;

a user device receiving the push and carousel content; and a storage device storing the push and carousel content associated with the user device.

17. A system as recited in claim 16 wherein the push scheduler module updates the channel listing system based on the channel block.

18. A system as recited in claim 16 wherein the schedule manager module assigns the push and carousel content based on a popularity score.

19. A system as recited in claim 16 further comprising a content management system that retrieves push and carousel content based on the assignment.

20. A system as recited in claim 16 wherein the push scheduler module communicates a notification of the assignment to storage device.

21. A system as recited in claim 16 further comprising a program associated data scheduling system scheduling transmission of program associated data based on the assignment.

22. A system as recited in claim 21 wherein the program associated data comprises future program associated data, current program associated data and termination program associated data.

23. A system as recited in claim 16 further comprising a satellite communicating the push and carousel content therethrough.

24. A system as recited in claim 16 wherein communicating content comprises communicating push and carousel content through a broadband system.

25. A system as recited in claim 16 wherein the time period extends over multiple days.

26. A system as recited in claim 16 wherein the content channel data comprises a content channel start time, a content channel stop time and content channel bit rate.

27. A system as recited in claim 16 wherein the content channel data comprises a content channel start time, a content channel stop time, a content channel bit rate, a transponder identifier, and a service channel identifier.

28. A system as recited in claim 16 further comprising an auto scheduler module having a plurality of queues and a user interface for assigning content to a plurality of queues.

* * * * *